June 10, 1969 D. L. TIPTON 3,449,601
METHOD AND APPARATUS FOR GENERATING ELECTRIC POWER
Filed Dec. 17, 1965
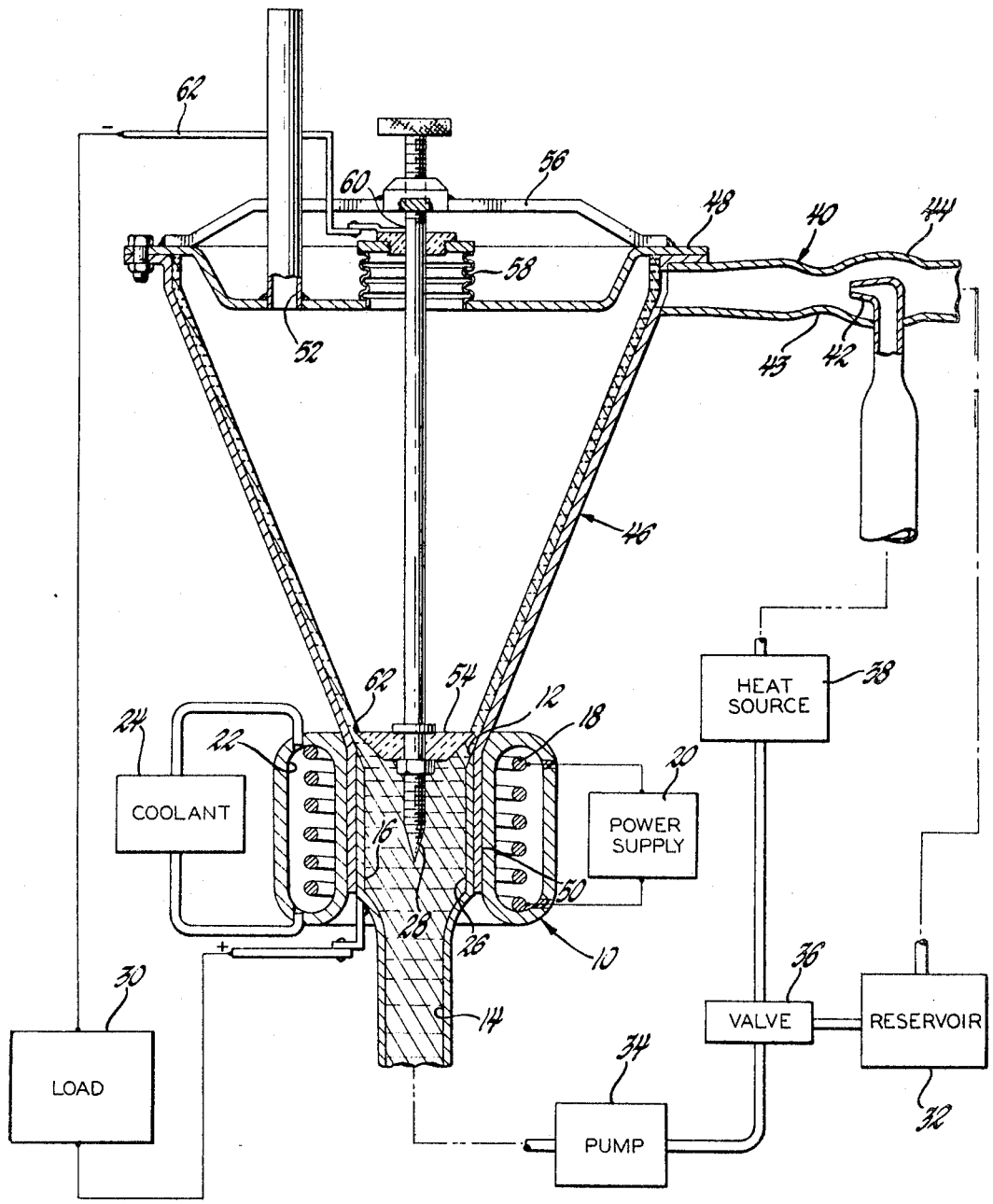
INVENTOR.
Donald L. Tipton
BY
Hugh L. Fisher
ATTORNEY : 3,449,601
METHOD AND APPARATUS FOR GENERATING ELECTRIC POWER
Donald L. Tipton, Speedway, Ind., assignor to General Motors Corporation, Detroit, Mich., a corporation of Delaware
Filed Dec. 17, 1965, Ser. No. 514,621
Int. Cl. H02k 45/00; G21d 7/02
U.S. Cl. 310—11     16 Claims

ABSTRACT OF THE DISCLOSURE

Electric power generating method and apparatus utilizing a magnetohydrodynamic generator which is supplied conductive working fluid by an injector-condenser. The injector-condenser utilizes a gaseous phase of the working fluid to pump a liquid phase of the working fluid from a reservoir and causes the transfer of a two phase stream of working fluid at a high velocity to a frusto-conical chamber where it follows a vortex-like path. In this chamber the gaseous and liquid phases are centrifugally separated and the gaseous phase is prevented from entering the magnetohydrodynamic chamber by a separator.

---

This invention relates to improved method and apparatus for generating electric power.

The generation of electric power by the magnetohydrodynamic principle has many advantages, among which are structural simplicity and the need for few, if any, moving parts. To facilitate the attainment of the required velocities for operating an MHD generator, the working fluid is usually converted to a gaseous form. But because the working fluid when in a gaseous form is not as conductive as when in a liquid form, the power densities are considerably less. These reduced power densities can be offset somewhat by seeding the gas. Therefore, as can be appreciated, compromises are required even for moderate efficiencies.

To overcome the foregoing, a new and different electric generating system is proposed involving method and apparatus whereby the gaseous phase of a working fluid is utilized to impart a high velocity component to the liquid phase of the working fluid, after which the two phases are separated and only the liquid phase is transferred through the generator; thus providing substantially higher power densities.

Somewhat more specifically contemplated is the unique provision for entraining the liquid phase of the working fluid with the gaseous phase so as to develop a two-phase high velocity stream of the working fluid, which is directed along a spiral path. This facilitates the separation of the two phases, after which only the liquid phase is permitted to enter the generator.

The foregoing and other objects and advantages of the invention will become apparent from the following description and from the accompanying drawing, in which the single figure portrays schematically, apparatus for carrying out the principles of the invention.

Referring now to the drawing, the numeral 10 denotes generally a magnetohydrodynamic generator having an inlet 12 and and outlet 14 together providing a passage 16 for a conductive working fluid supplied to the inlet 12. The magnetic field is induced within the passage 16 by a solenoid- type winding 18, which is connected to a suitable power supply 20. The power supply 20, by way of example only, would supply 30 to 100 amperes of current at approximately 1 volt. The structure between the winding 18 and the passage 16 is selected so as to provide a low reluctance path for the magnetic flux. Also, if necessary, the winding 18 can be enclosed by a cooling chamber 22 and the coolant, such as helium, is supplied continuously thereto from an appropriate coolant source 24.

The passage 16 is defined by an annular electrode 26, which is concentrically aligned with and spaced from another rod-like electrode 28. This latter electrode 28 has another function to be explained. Both of the electrodes 26 and 28 are electrically insulated from their adjacent surfaces so that when the working fluid proceeds through the passage 16 along a spiral path, current is induced in the radial direction by the inner action of the mutually perpendicular magnetic field and the tangentially flowing working fluid. Current flow then is caused from the one electrode, such as electrode 26, through a load 30 and back to the other electrode 28. The magnetohydrodynamic principles involved are well known and, therefore, are not further discussed here.

The working fluid for the generator 10 may be of any known type, such as an alkali metal or mercury, and can be stored within a reservoir 32. This working fluid is circulated to and from the reservoir 32, preferably through the illustrated closed-loop system. In this system a high pressure pump 34 has its inlet connected to the outlet 14 of the generator 10 and its outlet connected through a suitable valve 36, both to the reservoir 32 and to a heat source 38. If an open-loop system is used, of course, the pump 34 would not be required and the generator 10 would exhaust directly into the reservoir 32. The heat source 38 may be nuclear and heats the liquid phase of the working fluid proceeding from the generator 10 to a high enough temperature to vaporize it. If the alkali metal is used the temperature would be from 1600° F. to 2000° F.

As will become apparent the gaseous phase of the working fluid is used to impart a high velocity to the liquid phase of the working fluid to effect its transfer through the passage 16 in the generator 10. To obtain this high velocity and also to pump the liquid phase of the working fluid from the reservoir 32, an ejector-condenser denoted generally at 40 is employed. This ejector-condenser 40 includes a nozzle 42 that has the exit therefrom aligned with the throat of a venturi section 43 of a flow channel 44. The gaseous phase of the working fluid having a high energy level will, therefore, exit from the nozzle 42 at a high velocity. This gaseous phase of the working fluid will transfer some of this energy to the liquid phase of the working fluid. Thus the gaseous phase of the working fluid entrains the liquid phase so as to develop a two-phase stream of the working fluid having a very high velocity such that the working fluid will ultimately proceed through the generator 10 at speeds of 250 to 300 feet per second. Stated differently, a pressure differential is created by the exhausting of the high energy gaseous phase of the working fluid from the nozzle 42 and this pressure differential causes the liquid phase of the working fluid to be drawn from the reservoir 32. The two phases mix and, because the liquid phase of the working fluid is much cooler, some of the gaseous phase of the working fluid will condense and change to the liquid phase.

From the flow channel 44 the two-phase stream of working fluid goes into a chamber 46. The chamber 46 is shaped to direct the stream along a circuitous or vortex-like path so that centrifugal separation of the gaseous and liquid phases occurs. In this embodiment the chamber 46 is frustoconical-shaped with the large end enclosed by a sealing member 48 and the small end provided with a throat 50 that is electrically insulated from and surrounds the electrode 26. With this shape the two-phase stream spirals downwardly to the inlet 12 of the generator 10. As this stream spirals downwardly the liquid phase of the working fluid will cling to the inner surface of the chamber 46 and develop a film of a depth determined by well known factors; e.g., its velocity. However, the less dense gaseous phase of the working fluid will accumulate in the center of the chamber 46 and subsequently pass from the chamber 46 through an exhaust opening 52.

This isolated gaseous phase of the working fluid is prevented from entering the generator passage 16 by an annular separator 54. If a mercury or alkali metal is employed the separator 54 is preferably formed of a ceramic material comprising alumina glass or other electrically inert material. The material must, of course, be capable of withstanding the high heats and whatever forces are imposed upon it. This separator 54 is secured to the electrode 28 and may be adjustably maneuvered up and down axially relative to the generator inlet 12 merely by rotating the electrode 28. This is achieved by threadedly connecting the upper end of the electrode 28 to a cover plate 56 suitably attached to the sealing member 48 at the upper end of the chamber 46. An appropriate seal at 58 surrounds the electrode 28 where it exits from the inside of the chamber 46. Also, the electrode 28 at a junction 60 is connected by a conductor 62 to the load 30.

As can be seen in the drawing, the axial adjustment of the electrode 28 causes an edge 62 of the separator 54 to, in effect, intersect or slightly shear the film of liquid formed along the inside of the chamber 46. This penetration of the film produces a seal that keeps the gaseous phase from the generator 10. The extent that the separator 34 shears the film must be such that the spiral flow is not altered, but adequate to effect separation of the two phases so that none of the gaseous phase of the working fluid enters the passage 16.

Briefly reviewing the operation of the system, the pump 34 will withdraw from the passage 16 the liquid phase of the working fluid and then supply it as determined by the adjustment of a valve 36 in the proper proportions both to the heat source 38 and the reservoir 32. The heat source 38 increases the temperature of the working fluid until it is in gaseous form; after which is proceeds to the ejector-condenser 40 and causes the high velocity to be imparted to the now two-phase stream of working fluid. This high velocity working stream enters the upper end of the chamber 46 and then pursues a spiral path down the chamber 46 and to the inlet 12 of the generator 10. While proceeding along this spiral path, the liquid and gaseous phases of the working fluid separate with the gaseous phase moving to the center of the chamber 46. Further separation is effected by the positioning of the separator 54 to, in effect, afford a seal by shearing the film of liquid. This liquid phase of the working fluid then spirals through the passage 16 and the electric current is developed in the foregoing way.

From the foregoing, it will be appreciated that by the novel method and apparatus only the liquid phase of the working fluid proceeds through the generator 10, thus achieving higher power densities. The benefits from the use of the gaseous phase of the working fluid for achieving high velocities are still gained. Moreover, the gaseous phase is also employed to entrain the liquid phase of the working fluid while imparting a high velocity component to the resultant two-phase stream. This enables higher power densities to be achieved and additionally generates the spiralling flow that facilitates the centrifugal separation.

The invention is to be limited only by the following claims.

What is claimed is:

1. The method of supplying a conductive working fluid to an inlet of a magnetohydrodynamic generator comprising the steps of developing from a conductive working fluid both a liquid and a gaseous phase thereof, flowing the gaseous phase through a restriction so as to entrain the liquid phase and produce a high velocity two-phase stream of the working fluid, directing the two-phase stream along a circuitous path to the generator so as to cause the gaseous phase to be attracted to the center of the path and thereby separate the gaseous phase from the stream prior to the entrance thereof to the generator, and restricting the inlet to the generator so that only the liquid phase of the working fluid is allowed to pass therethrough.

2. The method of supplying a conductive working fluid to an inlet of a magnetohydrodynamic generator comprising the steps of developing from a conductive working fluid both a liquid and a gaseous phase thereof, flowing the gaseous phase through a restriction so as to entrain the liquid phase and produce a high velocity two-phase stream of the working fluid, directing the two-phase stream to the generator along a circuitous path having a vortex-like shape with a diameter that diminishes as the stream advances toward the generator so as to cause the gaseous phase to be attracted to the center of the vortex-like path and thereby separate the gaseous phase from the stream prior to the entrance thereof to the generator, and restricting the center of the inlet to the generator so as to prevent the gaseous phase from entering the generator while permitting substantially all of the liquid phase to enter the generator.

3. In an electric power generating system, the combination of a magnetohydrodynamic generator including an inlet and an outlet so connected as to define a flow passage therethrough for a conductive working fluid, means generating a magnetic field in the passage, and a pair of spaced apart electrodes so aligned relative to the passage that an electric current is caused to flow therethrough when the working fluid flows through the passage; means supplying a two-phase stream of the working fluid at a high velocity to the generator inlet; and means admitting only a liquid phase of the working fluid to the generator inlet.

4. The electric power generating system described in claim 3, wherein the supplying means includes means directing the stream along a circuitous path toward the generator inlet so as to cause the gaseous phase to be attracted toward the center of the path.

5. The electric power generating system described in claim 3, wherein the supplying means includes means providing both liquid and gaseous phases of the working fluid, means entraining the liquid phase with the gaseous phase so as to develop a two-phase high velocity stream of the working fluid, and means directing the stream along a circuitous path toward the generator inlet so as to cause the gaseous phase to be attracted toward the center of the path.

6. The electric power generating system described in claim 3, wherein the supplying means includes means providing both liquid and gaseous phases of the working fluid and means entraining the liquid phase with the gaseous phase so as to develop the two-phase high velocity stream of the working fluid.

7. The electric power generating system described in claim 6, wherein the entraining means includes a flow channel communicating with the liquid phase of the working fluid and an ejector having the gaseous phase of the working fluid flowing therethrough and so arranged relative to the channel that the gaseous phase entrains the liquid phase and develops the two-phase high velocity stream.

8. The electric power generating system described in claim 5, wherein the directing means includes a chamber having the entrance thereof arranged to receive the two-phase stream from the entraining means and the exit thereof communicating with the generator inlet, the chamber being so shaped as to cause the stream to flow toward the generator inlet in a spiral path and thereby cause the gaseous phase to be attracted to the center of the chamber and the liquid phase to form a film along the chamber.

9. In an electric power generating system: the combination of a magnetohydrodynamic generator including an inlet and an outlet so connected as to define a flow passage therethrough for a conductive working fluid, means generating a magnetic field in the passage, and a pair of spaced apart electrodes so aligned relative to the passage that an electric current is caused to flow therethrough when the working fluid flows through the passage; and means supplying a two-phase stream of the working fluid at a high velocity to the generator inlet; the supplying means including means providing both liquid and gaseous phases of the working fluid, means entraining the liquid phase with the gaseous phase so as to develop a two-phase high velocity stream of the working fluid, and means directing the stream along a circuitous path toward the generator inlet so as to cause the gaseous phase to be attracted toward the center of the path, the directing means including a chamber having the entrance thereof arranged to receive the two-phase stream from the entraining means and the exit thereof communicating with the generator inlet, the chamber having a frustoconical configuration, with the small end thereof communicating with the generator inlet so as to cause the stream to flow toward the generator inlet in a spiral path and thereby cause the gaseous phase to be attracted to the center of the chamber and the liquid phase to form a film along the chamber, and an exhaust opening for the gaseous phase of the working fluid.

10. The electric power generating system described in claim 5, wherein the entraining means includes a flow channel communicating with the liquid phase of the working fluid and an ejector having the gaseous phase flowing therethrough and so arranged relative to the channel that gaseous phase entrains the liquid phase and develops the two-phase high velocity stream, and further wherein the directing means includes a chamber having the entrance thereof arranged to receive the two-phase stream from the entraining means and the exit thereof communicating with the generator inlet, the chamber being so shaped as to cause the stream to flow toward the generator inlet in a spiral path and thereby cause the gaseous phase to be attracted to the center of the path and the liquid phase to form a film along the chamber.

11. The electric power generating system described in claim 3, wherein the admitting means includes an annular separating element arranged relative to the generator inlet so as to intersect the liquid phase film and thereby effect a seal therebetween for preventing the gaseous phase from entering the generator inlet.

12. The electric power generating system described in claim 11, wherein the annular separating element is movable so as to be adjustably positionable relative to the generator inlet.

13. The electric power generating system described in claim 11, wherein the annular separating element is joined to one of the electrodes and is also movable so as to be adjustably positionable relative to the generator inlet.

14. In an electric power generating system: the combination of a magnetohydrodynamic generator including an inlet and an outlet so connected as to define a flow passage therethrough for a conductive working fluid, means generating a magnetic field in the passage, and a pair of spaced apart electrodes so aligned relative to the passage that an electric current is caused to flow therethrough when the working fluid flows through the passage; means supplying a two-phase stream of the working fluid at a high velocity to the generator inlet; the supplying means including means providing both liquid and gaseous phases of the working fluid, means entraining the liquid phase with the gaseous phase so as to develop a two-phase high velocity stream of the working fluid, and means directing the stream along a circuitous path toward the generator inlet so as to cause the gaseous phase to be attracted toward the center of the path; and means admitting only a liquid phase of the working fluid to the generator inlet; the admitting means having an annular separating element arranged relative to the generator inlet so as to intersect the liquid phase film and thereby effect a seal therebetween for preventing the gaseous phase from entering the generator inlet.

15. In an electric power generating system: the combination of a magnetohydrodynamic generator including an inlet and an outlet so connected as to define a flow passage therethrough for a conductive working fluid, means generating a magnetic field in the passage, and a pair of spaced apart electrodes so aligned relative to the passage that an electric current is caused to flow therethrough when the working fluid flows through the passage; means supplying a two-phase stream of the working fluid at a high velocity to the generator inlet; the supplying means including means providing both liquid and gaseous phases of the working fluid, means entraining the liquid phase with the gaseous phase so as to develop a two-phase high velocity stream of the working fluid, and means directing the stream along a circuitous path toward the generator inlet so as to cause the gaseous phase to be attracted toward the center of the path, the directing means including a chamber having the entrance thereof arranged to receive the two-phase stream from the entraining means and the exit thereof communicating with the generator inlet, the chamber being so shaped as to cause the stream to flow toward the generator inlet in a spiral path and thereby cause the gaseous phase to be attracted to the center of the chamber and the liquid phase to form a film along the chamber; and means admitting only a liquid phase of the working fluid to the generator inlet, the admitting means having an annular separating element arranged relative to the generator inlet so as to intersect the liquid phased film and thereby effect a seal therebetween for preventing the gaseous phase from entering the generator inlet.

16. In an electric power generating system; the combination of a magnetohydrodynamic generator including an inlet and an outlet so connected as to define a flow passage therethrough for a conductive working fluid, means generating a magnetic field in the passage, and a pair of spaced apart electrodes so aligned relative to the passage that an electric current is caused to flow therethrough when the working fluid flows through the passage; means supplying a two-phase stream of the working fluid at a high velocity to the generator inlet; the supplying means including means providing both liquid and gaseous phases of the working fluid, means entraining the liquid phase with the gaseous phase so as to develop a two-phase high velocity stream of the working fluid, the entraining means including a flow channel communicating with the liquid phase of the working fluid and an ejector having the gaseous phase flowing therethrough and so arranged relative to the channel that gaseous phase entrains the liquid phase and develops the two-phase velocity stream, and means directing the stream along a circuitous path toward the generator inlet so as to cause the gaseous phase to be attracted toward the center of the path, the directing means including a chamber having the entrance thereof arranged to receive the two-phase stream from the entraining means and the exit thereof communicating with the generator inlet, the chamber being so shaped as to cause the stream to flow toward the generator inlet in a spiral path and thereby cause the gaseous phase to be attracted to the center of the chamber and the liquid phase to form a film along the chamber, and means admitting only a liquid phase of the working fluid to the generator inlet, the admitting means having an annular separating element movably arranged relative to the generator inlet so as to intersect the liquid phased film and thereby effect a seal therebetween for preventing the gaseous phase from entering the generator inlet, the element being joined to and movable with one of the electrodes.

References Cited
UNITED STATES PATENTS 3,294,989　12/1966　Eichenberger _____ 310—11
3,320,444　 5/1967　Prem _____ 310—11

DAVID X. SLINEY, *Primary Examiner.*